United States Patent Office 2,991,706
Patented July 11, 1961

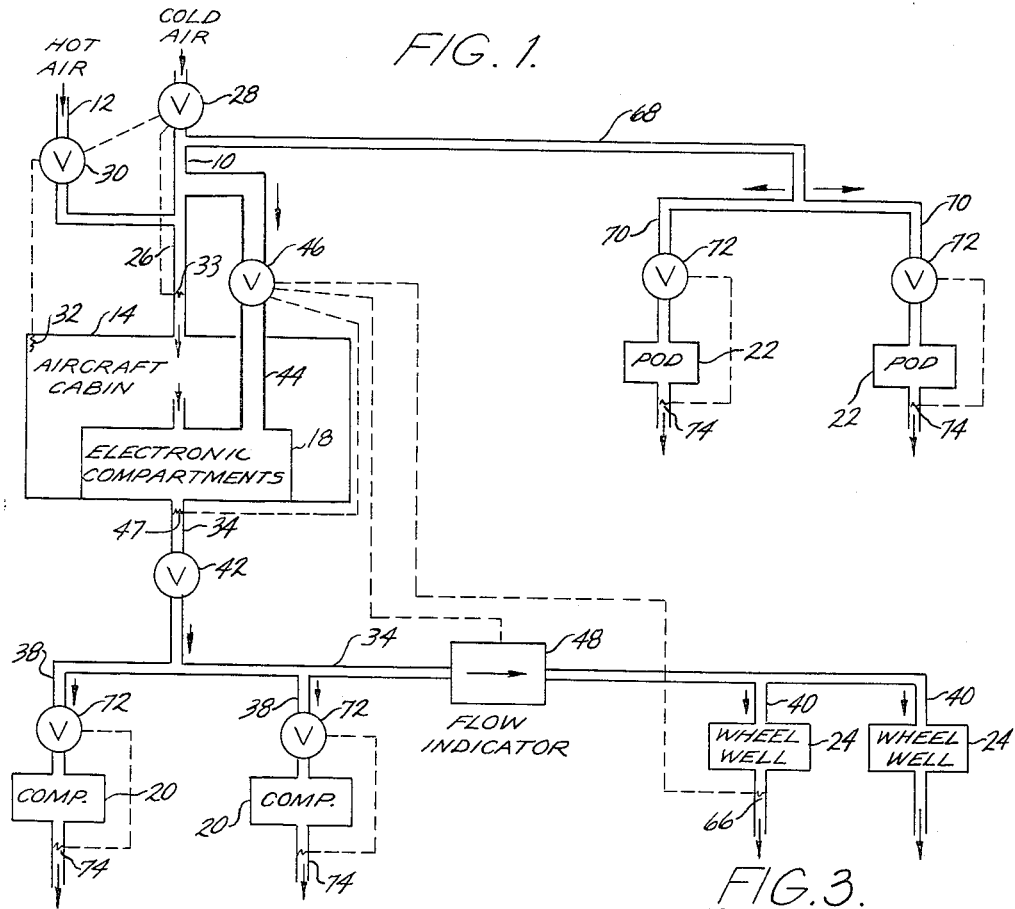

2,991,706
SYSTEM FOR DISTRIBUTING CONDITIONED
AIR IN AIRCRAFT
Stanley G. Best, Manchester, Conn., assignor to United
Aircraft Corporation, East Hartford, Conn., a corporation of Delaware
Filed Feb. 3, 1958, Ser. No. 712,738
12 Claims. (Cl. 98—1.5)

This invention relates to an improved distribution system for air conditioning the cabin and other compartments and devices of an aircraft.

It is the general object of the invention to provide a system for distributing conditioned air to an aircraft cabin, one or more compartments supplied with cooling air from the cabin and which may be located within the cabin, and to a plurality of compartments and devices disposed externally of the cabin wherein the demand for conditioned air and the associated penalty on aircraft engine performance are minimized.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a schematic illustration of the distribution system and of the aircraft cabin and other compartments and devices which it serves;

FIG. 2 is a schematic illustration of a flow responsive device of a type which may be utilized for controlling the flow of conditioned air through a portion of the distribution system; and FIG. 3 is a schematic illustration of an exemplary valve and actuator usable in the distribution system.

It is conventional practice in providing air conditioning for aircraft to bleed air from the aircraft engine compressor to supply the air conditioning system. A portion of the engine bleed air is passed through a refrigerating apparatus and the remainder of the engine bleed air is mixed with the cold or refrigerated air prior to introduction to the cabin. The present invention is not primarily concerned with the manner or means of handling the engine bleed air so that a portion of it is refrigerated and so that another portion is delivered at a high temperature and, therefore, it is necessary for an understanding of the invention to show only a cold air supply conduit 10 and a hot air supply conduit 12 for the aircraft cabin 14.

In addition to supplying air for conditioning the aircraft cabin 14, the distribution system provided herein supplies air for the cooling requirements of additional compartments and devices, one or more of which may be located within the cabin such as the compartment 18, and others of which may be disposed outside the cabin such as a plurality of compartments 20, 20 which may comprise compartments of the fuselage, a plurality of compartments or pods 22, 22 external of the fuselage, and a plurality of wheel wells 24, 24 which are also externally located.

The necessity of providing temeprature and pressure conditioned air to aircraft cabins for the comfort and safety of occupants has long been recognized, and present air conditioning systems and air distribution systems have fulfilled the necessary requirements for cabin air conditioning. However, the necessity to provide cooling air streams to other compartments of the fuselage, to pods or compartments located externally of the fuselage, and to the aircraft wheel wells and the like has only recently arisen with the advent of superspeed aircraft. Without cooling at the compartments and devices external of the cabin, structural damage caused by overheating at high speed flight will result. With the added requirements for air cooling, new problems have been encountered in the design and construction of air distribution systems which will provide the necessary cooling without requiring inordinate amounts of engine bleed air such that the aircraft engine operating efficiency suffers an unacceptable loss. The system of air distribution provided in accordance with the present invention is designed to provide the necessary cooling of the external compartments and devices with a minimum of engine bleed air.

As will be apparent from the drawing, the entire air supply for the cabin 14 is furnished by the engine compressor supply system, the cold air conduit 10 and the hot air conduit 12 being connected to a cabin inlet conduit 26. In accordance with conventional practice, means are provided for controlling the flow of cold air from the refrigeration apparatus through the conduit 10 and for controlling the flow of hot air from the engine compressor through the conduit 12. Said means may comprise a modulating valve 28 disposed in the cold air conduit 10 and a second modulating valve 30 disposed in the hot air conduit 12. The valves 28 and 30 are preferably gaged or mechanically interconnected and their operation is coordinated such that one of said valves may be held stationary while the position of the other of said valves is varied or, alternatively, the position of both of said valves may be varied as required to introduce the proper amounts of hot and cold air to the cabin 14 through the conduit 26 for maintaining a desired temperature within said cabin. In preferred form, the valves 28 and 30 are controlled so as to be positioned automatically responsive to temperature within the cabin. That is, a temperature sensitive or responsive control element 32 is located within the cabin 14 to control suitable actuators for the valves. If electrically operable valves are employed, the element 32 may comprise a temperature sensitive resistor or "thermistor" connected in a bridge network so that an unbalance signal from the bridge network can be amplified to operate solenoids or other electrically operable means in the valves 28 and 30. If the valves are pneumatically operated, the temperature sensitive element 32 may comprise a temperature-pressure transducer which controls the operation of pneumatic valve actuators. The present invention does not relate to improvements in temperature sensing means or in valve operating means and, therefore, no specific or detailed showing has been made of such temperature sensing or valve operating means.

While under the majority of conditions of aircraft operation a flow of cooling air is required by the cabin, a flow of warming air may be needed under other conditions of operation of the aircraft and, under still other anticipated conditions, the temperature within the cabin may be suitable for the comfort and safety of the of the occupants without the aid of conditioned air. Thus, at times, very little or no air flow may be directed to the cabin and since there always exists a need for some nominal flow of air for ventilation and for pressurization, it is conventional practice to provide means for maintaining a minimum flow thereto. This may be accomplished, for example, by providing a minimum flow sensor, which may take the form of a pressure sensor 33 disposed in the conduit 26 and operable to override the signal from the temperature responsive element 32 to the valve 28 at times when said signal is calling for very little or no air flow and to cause said valve to open whereby to insure that a preselected minimum flow from the conduit 10 will be available for ventilating and pressurizing the cabin under all conditions of aircraft operation.

The air admitted to the cabin 14 from its inlet conduit 26 also supplies the compartment 18 or a plurality of such compartments which may be located within the cabin 14 and which must be air cooled. Such compartments may be cabinets or the like containing electronic apparatus which causes heating. The air is discharged from the internal compartment or compartments and from the cabin 14 in a discharge conduit 34. Thus, it will be seen that the cabin 14 and the internal compartment 18 are connected in series for flow of a cooling air stream therethrough.

The discharge conduit 34, in accordance with the present invention, communicates with a first plurality of feed conduits 38, 38 for the compartments 20, 20 and with a second plurality of feed conduits 40, 40 for the wheel wells 24, 24 and thus serves as a manifold conduit adapted for supplying cooling air to said compartments and wheel wells. A pressure regulating valve 42 is located in the discharge conduit 34 upstream of the feed conduits 38, 38 and is constructed and arranged to provide for flow through said conduit in accordance with a preselected schedule of aircraft cabin pressures. Thus, it will be seen that a first source of cooling air for at least some of the compartments and devices external of the cabin is provided in the form of discharge air supplied to the discharge conduit or manifold 34 from the internal compartment 18 and the cabin 14.

In further accord with the present invention, a second source of cooling air for the compartments 20, 20 and the wheel wells 24, 24 is provided and may include a connecting conduit between the cold air supply conduit 10 and the cabin discharge conduit or manifold 34. In preferred form, the cold air from the conduit 10 is directed by a connecting conduit 44 into the compartment 18 and thence to the cabin discharge conduit 34.

Further in accordance with the present invention, means is provided for controlling the flow of air through the connecting conduit 44 whereby to provide for the required flow of cooling air through the compartment 18, the plurality of compartments 20, 20 and the wheel wells 24, 24. In preferred form, said means comprises a modulating type valve 46 disposed in said conduit and which is preferably electrically operated, as by a proportional solenoid, under the control of means responsive to the temperature of air within the compartment 18, flow responsive means associated with the manifold 34 and means responsive to the temperature of air in the wheel wells 24, 24. An exemplary valve and valve actuating means is shown in FIG. 3 and comprises a butterfly type valve 45, a conventional transducer and valve operator including a proportional solenoid 49 which operates a pressure responsive valve actuator 51, a conventional amplifier 53 and a well-known type of selector circuit 55. The selector circuit 55 includes rectifiers 55a, 55b and 55c respectively connected in lines carrying electrical signals from the aforesaid three means which control the valve 46 and said circuit selects the largest signal (the signal calling for the largest flow through the conduit 44) and supplies the said signal to the amplifier 53 whereby to effect operation of the valve 45 in keeping with said signal.

The means responsive to the temperature of air in the compartment 18 preferably comprise a temperature responsive element 47 which may be disposed in the discharge conduit 34 for sensing the temperature of the air flowing therein whereby to be advised of the temperature of the air in the compartment 18. The temperature responsive element 47 is adapted to supply an electrical signal to the selector circuit 55 to urge the valve 46 in the valve opening direction whenever the temperature of the air in the compartment 18 exceeds a preselected maximum limit whereby to direct some of the conduit 10 cold air from the conduit 26 and through the conduit 44, the latter conduit preferably being of larger cross section than the conduit 26, as shown in the drawing, for insuring a flow of air therethrough upon opening of the said valve 46.

The flow responsive means is adapted to maintain a preselected minimum flow of cooling air at a point in the cabin discharge conduit or manifold 34 between the feed conduits 38, 38 for the compartments 20, 20 and the feed conduits 40, 40 for the wheel wells 24, 24 and in preferred form, said flow responsive means comprises the flow indicator 48 shown in block form in FIG. 1 of the drawing and shown schematically and in greater detail in FIG. 2.

A housing 50 of the flow indicator 48 defines a first chamber 52 which receives air from the cabin discharge conduit 34. The housing 50 also defines a second and larger chamber 54 which communicates with the downstream portion of the discharge conduit 34. Disposed within the chamber 54 and serving to separate said chamber from the first chamber 52 is a flow sensitive member 56 which is urged in one direction by a spring 58 and which is urged in an opposite direction by the pressure of the cooling air in the chamber 52. The flow sensitive member 56 is adapted to provide communication between the chambers 52 and 54 when the pressure of the air in the chamber 52 is sufficient to overcome the force exerted by the spring 58 and urge said member to the right. A link 60 is connected at one end to the flow sensitive member 56 and is connected at its opposite end to a second link 62 which is pivotally mounted on the housing 50. The link 62 is adapted to vary the resistance of a potentiometer indicated generally at 64 and which is connected with the selector circuit 55.

It will be seen that the flow sensitive member 56 is responsive to the pressure of the air in the chamber 52 and to the flow of cooling air through the manifold 34. That is, the position of the said member will be proportional to the pressure of the air in the manifold 34 and proportional to the flow therethrough, the resistance to air flow downstream of the indicator 48 remaining substantially constant. It follows that the position of the motion transmitting system comprising the link 60 and the link 62 will be proportional to the position of said member and that the potentiometer 64 will be accordingly adjusted to reflect the pressure and flow conditions in said conduit at any given instant. By suitably selecting the spring 58 and suitably presetting the potentiometer 64, the voltage signal to the selector circuit 55 from said potentiometer may be controlled whereby to cause opening of the said valve when the flow sensitive member 56 is moved leftwardly beyond a position representing a selected minimum flow limit.

When the flow of cooling air through the flow indicator 48 is reduced below the preselected minimum limit, the flow sensitive member 56 is moved leftwardly beyond the aforesaid preselected position and the voltage signal to the selector circuit 55 is altered accordingly by the potentiometer 64 whereby the valve 46 is caused to commence opening operation. As the valve 46 is opened to allow cold air from the conduit 10 to flow through the conduit 44, the compartment 18 and into the cabin discharge conduit 34, it will be seen that the temperature within the aircraft cabin 14 is, in most instances, initially increased due to the diversion of cold air therefrom. The temperature responsive element 32, sensing the condition of increased temperature, then causes the valve 28 to further open thereby making available additional cooling air flow to the conduits 26 and 44.

In the event that the cabin does not require cooling at the time the valve 46 is opened and the air flowing through the valve 28 is only the minimum flow required for ventilating and pressurizing said cabin, the temperature responsive element 32 may not be operative to cause increased opening of the valve 28 as described above. The pressure responsive element 33, however, as a result of the diversion of air from the conduit 26 to the conduit 44 by opening of the valve 46, will sense a reduced pressure in the conduit 26 representing air flow therethrough at a level below the minimum limit and will cause the valve 28 to move to a position of increased opening whereby to make available an increased flow of cooling air to the conduits 26 and 44. Thus, it will be seen that, irrespective of the prevailing conditions of aircraft operation, opening of the valve 46 in the conduit 44 in response to a signal from the flow indicator 48 denoting reduction in the flow of cooling air in the conduit 34 to a level below the preselected minimum limit will result in increased opening of the valve 28 in the cold air conduit 10 and the flow of cooling air through the conduit 44 and to the discharge conduit or manifold 34 will increase until flow at the indicator 48 has been returned to the minimum level whereupon opening movement of the valve 46 will cease.

As an alternative to this mode of operation of the valves 46 and 28, said two valves may be interconnected for sequential operation under the control of the flow indicator 48 such that the valve 46 would move to the full open position with the valve 28 remaining stationary. If the flow through the manifold 34 continued to be less than the minimum selected limit, the valve 28 would then open as required to satisfy the minimum flow requirements through said manifold whereupon the system would reach equilibrium.

It will be apparent from the foregoing that if the flow indicator 48 is set so as to maintain a mere trickle flow of air threthrough, the cooling requirements of the compartments 20, 20 located upstream thereof with respect to flow through the manifold 34 will be satisfied under all conditions of aircraft operation and, in addition, very little cooling air will be wasted by passing same through said indicator and the wheel wells 24, 24 when the latter do not require cooling. The cooling requirements of said wheel wells may be expected to be, in general, less severe than those of the compartments 20, 20 which may contain electronic apparatus generating considerable heat, said wheel wells' cooling requirements, however, under some anticipated conditions of aircraft operation, being in excess of the trickle flow constantly supplied thereto and provision therefore being made, in the preferred embodiment of the invention shown, for maintaining an adequate flow of cooling air therethrough at all times.

Means responsive to the temperature of air in the wheel wells 24, 24 are provided and comprise, in preferred form, a temperature responsive element 66 disposed in the discharge port of one of the wheel wells 24 and adapted to supply an electrical signal to the selector circuit 55 so as to be operable for further controlling the valve 46. Under conditions when the well wells 24, 24 do not require a cooling air stream, the temperature responsive element 66 has no effect on the operation of the valve 46, and said valve is under the control of the flow indicator 48 and the temperature responsive element 47 in the discharge conduit 34. When, however, the temperature within the wheel wells 24, 24 exceeds a preselected maximum limit, the temperature responsive element 66 operates to override the signals from said flow indicator and temperature responsive element and to cause the valve 46 to further open whereby to direct an increased flow of cooling air through the conduit 44 so as to increase the total flow of air through the manifold 34 to the wheel wells 24, 24 and thereby decrease the temperature therewithin.

From the foregoing, it will be apparent that the valve 46 in the conduit 44, which is operable under the control of the temperature responsive element 47, the flow indicator 48, and the temperature responsive element 66 and which responds to the signal calling for the greatest amount of cooling air flow, thereby insures adequate cooling of the internally located compartment 18, the compartments 20, 20 and the wheel wells 24, 24, the supply of cooling air, at the same time, being effectively conserved whereby to minimize the drain on the aircraft engine and the attendant penalty on overall aircraft performance.

Additional compartments or pods 22, 22 located externally of the cabin 14 may be cooled by cold air from the conduit 10 by means of a conduit 68 connected thereto and communicating with the feed conduits 70, 70. While the pods 22, 22 are shown as receiving a supply of cooling air independently of the cabin discharge conduit 34, it is to be understood that the said pods may be interchanged with the compartments 20, 20 or with the wheel wells 24, 24 and that it is also within the scope of the invention to arrange the conduits 34 and 68 supplying the various external compartments and devices in a variety of other configurations wherein a greater or lesser number of compartments and devices are respectively supplied with cooling air from each of said conduits.

It should be observed that a valve 72 is preferably provided at the inlet for each compartment and pod to control the flow of cooling air thereto. Preferably, each valve 72 is constructed and arranged to direct sufficient cooling air through the compartments and pods for maintaining a predetermined maximum temperature limit therein. A temperature responsive element 74 associated with a suitable actuator for each valve 72 to control operation thereof may be located within the compartment or pod being served or at a discharge port thereof as shown.

The invention claimed is:

1. An air distribution system for air conditioning an aircraft having a cabin and a plurality of additional compartments external of the cabin all of which require a cooling air stream, said system comprising a first cold air supply conduit connected with the cabin, a cabin discharge conduit, a feed conduit for some of the external compartments connected with the cabin discharge conduit, a second cold air supply conduit in communication with said cabin discharge conduit upstream of said feed conduit, a valve in said second cold air supply conduit, and flow responsive means connected with the cabin discharge conduit downstream of said feed conduit so as to be responsive to flow therein and operable to control said valve whereby to maintain a preselected minimum flow of cooling air in said discharge conduit downstream of said feed conduit.

2. An air distribution system for air conditioning an aircraft having a cabin and a plurality of additional compartments external of the cabin all of which require a cooling air stream, said system comprising a first cold air supply conduit connected with the cabin, a cabin discharge conduit, a feed conduit for some of the external compartments connected with the cabin discharge conduit, other of said external compartments being connected with said cabin discharge conduit downstream of said feed conduit, a second cold air supply conduit in communication with said cabin discharge conduit upstream of said feed conduit, a valve in said second cold air supply conduit, and flow responsive means connected with the cabin discharge conduit downstream of said feed conduit so as to be responsive to flow therein and operable to control said valve whereby to maintain a preselected minimum flow of cooling air in said discharge conduit downstream of said feed conduit.

3. An air distribution system for air conditioning an aircraft having a cabin and a plurality of additional compartments external of the cabin all of which require a cooling air stream, said system comprising a cold air supply conduit connected with the cabin, a cabin discharge conduit, a feed conduit for some of the external compartments connected with the cabin discharge conduit, other of said external compartments being connected with said cabin discharge conduit downstream of said feed conduit, a connecting conduit in communication with the cold air conduit and the cabin discharge conduit upstream of said feed conduit, a valve in said connecting conduit, and flow responsive means connected with the cabin discharge conduit downstream of said feed conduit so as to be responsive to flow therein and operable to control said valve whereby to maintain a preselected minimum flow of cooling air in said discharge conduit downstream of said feed conduit.

4. An air distribution system for air conditioning an aircraft having a cabin and a plurality of additional compartments external of the cabin all of which require a cooling air stream, said system comprising a first cold air supply conduit connected with the cabin, a cabin discharge conduit, a feed conduit for some of the external compartments connected with the cabin discharge conduit, other of said external compartments being connected with said cabin discharge conduit downstream of said feed conduit, a second cold air supply conduit in communication with said cabin discharge conduit upstream of said feed conduit, a valve in said second cold air supply conduit operable to control the temperature within said other external compartments, and flow responsive means connected with the cabin discharge conduit downstream of said feed conduit so as to be responsive to flow therein and operable to control said valve whereby to maintain a preselected minimum flow of cooling air in said discharge conduit downstream of said feed conduit.

5. An air distribution system for air conditioning an aircraft having a cabin and a plurality of additional compartments external of the cabin all of which require a cooling air stream, said system comprising a cold air supply conduit connected with the cabin, means responsive to the temperature of air within the cabin for controlling the flow of air through said cold air conduit, a cabin discharge conduit, a feed conduit for some of the external compartments connected with the cabin discharge conduit, other of said external compartments being connected with said cabin discharge conduit downstream of said feed conduit, a connecting conduit in communication with the cold air conduit and the cabin discharge conduit upstream of said feed conduit, a valve in said connecting conduit, and flow responsive means connected with the cabin discharge conduit downstream of said feed conduit so as to be responsive to flow therein and operable to control said connecting conduit valve whereby to maintain a preselected minimum flow of cooling air in said discharge conduit downstream of said feed conduit.

6. An air distribution system for air conditioning an aircraft having a cabin and a first compartment supplied with cooling air from the cabin and a plurality of additional compartments external of the cabin all of which require a cooling air stream, said system comprising a first cold air supply conduit connected with the cabin, a discharge conduit for the first compartment, a feed conduit for some of the external compartments connected with the discharge conduit, other of said external compartments being connected with said discharge conduit downstream of said feed conduit, a second cold air supply conduit connected with said first compartment, a valve in said second cold air supply conduit, and flow responsive means connected with said discharge conduit downstream of said feed conduit so as to be responsive to flow therein and operable to control said valve whereby to maintain a preselected minimum flow of cooling air in said discharge conduit downstream of said feed conduit.

7. An air distribution system for air conditioning an aircraft having a cabin and a first compartment supplied with cooling air from the cabin and a plurality of additional compartments external of the cabin all of which require a cooling air stream, said system comprising a cold air supply conduit connected with the cabin, a discharge conduit for the first compartment, a feed conduit for some of the external compartments connected with said discharge conduit, other of said external compartments being connected with said discharge conduit downstream of said feed conduit, a supply conduit for the first compartment connected with said cold air conduit, a valve in said first compartment supply conduit operable to control the temperature within said other external compartments, and flow responsive means connected with said discharge conduit downstream of said feed conduit so as to be responsive to flow therein and operable to control said valve whereby to maintain a preselected minimum flow of cooling air in said discharge conduit downstream of said feed conduit.

8. An air distribution system for air conditioning an aircraft having a cabin and a first compartment supplied with cooling air from the cabin and a plurality of additional compartments external of the cabin all of which require a cooling air stream, said system comprising a cold air supply conduit connected with the cabin, means responsive to the temperature of air within the cabin for controlling the flow of air through said cold air conduit, a discharge conduit for the first compartment, a feed conduit for some of the external compartments connected with said discharge conduit, other of said external compartments being connected with said discharge conduit downstream of said feed conduit, a supply conduit for the first compartment connected with said cold air conduit, a valve in said first compartment supply conduit operable to control the temperature within said other external compartments, and flow responsive means connected with said discharge conduit downstream of said feed conduit so as to be responsive to flow therein and operable to control said first compartment supply conduit valve whereby to maintain a preselected minimum flow of cooling air in said discharge conduit downstream of said feed conduit.

9. An air distribution system for air conditioning an aircraft having a cabin and a first compartment located within the cabin and supplied with cooling air therefrom and a plurality of additional compartments external of the cabin all of which require a cooling air stream, said system comprising a cold air supply conduit connected with the cabin, means responsive to the temperature of air within the cabin for controlling the flow of air through said cold air conduit, a discharge conduit for the first compartment, a feed conduit for some of the external compartments connected with said discharge conduit, other of said external compartments being connected with said discharge conduit downstream of said feed conduit, a supply conduit for the first compartment connected with said cold air conduit, a valve in said first compartment supply conduit operable to control the temperature within said other external compartments, and flow responsive means connected with said discharge conduit downstream of said feed conduit so as to be responsive to flow therein and operable to control said first compartment supply conduit valve whereby to maintain a preselected minimum flow of cooling air in said discharge conduit downstream of said feed conduit.

10. An air distribution system for air conditioning an aircraft having a cabin and a first compartment supplied with cooling air from the cabin and a plurality of additional compartments external of the cabin all of which require a cooling air stream, said system comprising a cold air supply conduit connected with the cabin, a discharge conduit for the first compartment, a feed conduit for some of the external compartments connected with said discharge conduit, other of said external compartments being connected with said discharge conduit downstream of said feed conduit, a cold air supply conduit connected with the first compartment, a valve in said first compartment supply conduit, means responsive to the temperature in said first compartment for controlling said first compartment supply conduit valve, flow responsive means connected with said discharge conduit downstream of said feed conduit so as to be responsive to flow therein and operable to control said first compartment supply conduit valve for maintaining a preselected minimum flow of cooling air in said discharge conduit downstream of said feed conduit, and means responsive to the temperature in said other external compartments for controlling said first compartment supply conduit valve, said first compartment supply conduit valve being selectively operable responsive to the controlling means therefor calling for the greatest amount of cooling air flow therethrough whereby to provide for adequate cooling of said first compartment and said additional compartments under all conditions of aircraft operation.

11. An air distribution system for air conditioning an aircraft having a plurality of aircraft compartments, said system including a cold air supply conduit, means for controlling the flow of air through said cold air supply conduit, a manifold conduit receiving cold air from said supply conduit, a plurality of branch conduits extending from said manifold conduit and connected respectively with the aircraft compartments to supply cooling air streams thereto, a valve associated with one of said compartments and operable to control the flow of air therethrough whereby to control the temperature therewithin, and means responsive to the flow of cooling air at a location in said manifold conduit downstream of the branch conduit leading to said one compartment but upstream of other of said branch conduits and operable to control said cold air supply conduit flow controlling means whereby to maintain a preselected minimum flow of cooling air in said manifold conduit at said location.

12. An air distribution system for air conditioning an aircraft having a plurality of aircraft compartments, said system including a cold air supply conduit, electrically operable means for controlling the flow of air through said cold air supply conduit, a manifold conduit receiving cold air from said supply conduit, a plurality of branch conduits extending from said manifold conduit and connected respectively with the aircraft compartments to supply cooling air streams thereto, a valve associated with one of said compartments and operable to control the flow of air therethrough whereby to control the temperature therewithin, and flow responsive means disposed in said manifold conduit at a location downstream of the branch conduit leading to said one compartment but upstream of other of said branch conduits, said flow responsive means comprising a housing defining communicating first and second chambers, a spring backed member disposed between said first and second chambers and movable responsive to the air flow therebetween, variable resistance electrical means, and motion transmitting means connected between said movable member and said electrical means and operable to vary the resistance of the latter in accordance with the position of said movable member, said electrical means being operable to control said electrically operable cold air supply conduit flow controlling means whereby to maintain a preselected minimum flow of cooling air in said manifold conduit at said location.

References Cited in the file of this patent
UNITED STATES PATENTS

| | | |
|---|---|---|
| 2,160,956 | Cheesman | June 6, 1939 |
| 2,191,141 | Grant | Feb. 20, 1940 |
| 2,316,237 | Grunert et al. | Apr. 13, 1943 |
| 2,385,664 | Warner | Sept. 25, 1945 |
| 2,412,071 | Warner et al. | Dec. 3, 1946 |
| 2,425,000 | Paget | Aug. 5, 1947 |
| 2,463,487 | Widgery et al. | Mar. 1, 1949 |
| 2,723,615 | Morris et al. | Nov. 15, 1955 |
| 2,814,241 | Silver | Nov. 26, 1957 |